United States Patent [19]

Protopopescu et al.

[11] Patent Number: 5,479,513
[45] Date of Patent: Dec. 26, 1995

[54] FAST AND SECURE ENCRYPTION-DECRYPTION METHOD BASED ON CHAOTIC DYNAMICS

[75] Inventors: Vladimir A. Protopopescu, Knoxville; Robert T. Santoro, Oak Ridge; Johnny S. Tolliver, Knoxville, all of Tenn.

[73] Assignee: Martin Marietta Energy Systems, Inc., Oak Ridge, Tenn.

[21] Appl. No.: 341,105

[22] Filed: Nov. 18, 1994

[51] Int. Cl.⁶ .................................... H04L 9/28
[52] U.S. Cl. .................. 380/28; 380/9; 380/46; 380/49
[58] Field of Search ................... 380/9, 28, 46, 380/49; 331/78; 364/717

[56] References Cited

U.S. PATENT DOCUMENTS 5,007,087  4/1991  Bernstein et al. .................. 380/46
5,048,086  9/1991  Bianco et al. ..................... 380/28
5,291,555  3/1994  Cuomo et al. .................. 380/46 X
5,379,346  1/1995  Pecora et al. ..................... 380/9 X Primary Examiner—Bernarr E. Gregory
Attorney, Agent, or Firm—E. A. Pennington; J. M. Spicer; H. W. Adams

[57] ABSTRACT

A method and system for the secure encryption of information. The method comprises the steps of dividing a message of length L into its character components; generating m chaotic iterates from m independent chaotic maps; producing an "initial" value based upon the m chaotic iterates; transforming the "initial" value to create a pseudo-random integer; repeating the steps of generating, producing and transforming until a pseudo-random integer sequence of length L is created; and encrypting the message as ciphertext based upon the pseudo random integer sequence. A system for accomplishing the invention is also provided.

22 Claims, 1 Drawing Sheet

FAST AND SECURE ENCRYPTION-DECRYPTION METHOD BASED ON CHAOTIC DYNAMICS

This invention was made with Government support under contract DE-AC05-840R21400 to Martin Marietta Energy Systems, Inc., and the Government has certain rights in this invention.

FIELD OF THE INVENTION

The present invention relates to cryptosystems, and more particularly, to an encryption/decryption method and system that is based upon the principles of chaotic dynamics.

BACKGROUND OF THE INVENTION

Cryptography is concerned with the alteration of messages to make them unintelligible to anyone except the intended recipient. The original message, M, also referred to as the plaintext, is represented by a finite string of symbols from a given alphabet, S. An encryption procedure codes the message using a transformation, E, that depends on a set of parameters, K, called the key. The result is an encrypted ciphertext $$C = E(M;K)$$

The encrypted ciphertext is meaningless to an unintended observer. In a symmetric cryptosystem, the recipient of the ciphertext retrieves the original message by using the same key as the sender and employing a decryption transformation, D:

$$D(E(M;K); K) = M.$$

Therefore, if the message is to be successfully interpreted, the same key must be shared by both the sender and recipient of the message.

In the past, cryptography was used primarily within the military, intelligence, and diplomatic communities. With the increased speed and facility of data transfer provided by modern computer systems and information superhighways, cryptographic applications have begun to appear in banking, administration, computer networking, and counter-narcotics activities.

The emergence of new cryptographic concerns in non-traditional areas has led to the development of several iterated cryptosystems. An iterated cryptosystem relies upon the repeated application of weak functions to produce cryptographically strong results. Specifically, many encryption methods are not strong enough to produce secure, strong results. However, when these methods are applied multiple times in series very good results may be achieved.

The theory behind iterated procedures is best demonstrated with reference to shuffling a deck of cards. Although the first shuffle of an ordered deck of cards only mixes the cards to a limited extent, subsequent shuffling of the same deck produces a well mixed deck of cards.

Currently the most popular iterated cryptosystem is the Data Encryption Standard (DES). The DES was adopted by the National Bureau of Standards in 1977. The DES, along with a large number of cryptosystems inspired by it, survived attempts at attack for several years. However, differential cryptanalysis has been used in recent years to effectively attack these systems. In addition to DES, differential cryptanalysis has exposed design flaws in many other iterated cryptosystems, showing that the time required to defeat some encryption techniques can by reduced to a matter of minutes, or even seconds, on personal computers. Although the DES itself appears relatively secure at this time, the revelation of exploitable weaknesses increases the need for alternative cryptosystems.

One drawback of iterated cryptosystems is the extreme difficulty associated with proving their security. One way to avoid this problem is to develop a cryptosystem that works from a strong foundation. The one-time pad is an example of such a cryptosystem. The one-time pad is the only cryptosystem which can be proven to be fully secure. However, in light of the severe requirements necessary to guarantee security, the one-time pad is not practical for general use.

Specifically, the one time pad requires, for any plaintext message M composed of i bits, a unique and random string K as the keyspace. Encryption of the plaintext messages is achieved by combining the plaintext message string and the random string by some bitwise mechanism, for example, the ciphertext C can be defined as the exclusive-or (XOR) product of M and K.

Applying the XOR operation, M and K are first converted into binary code. The binary codes representing M and K are then XORed bit by bit until the complete binary code of the ciphertext is produced. The ciphertext can then be converted to the plaintext message by XORing the ciphertext and the key.

The XOR operation, denoted $\otimes$, is completely defined by the following set of rules: $\otimes 0=0$; $\otimes 1=1$; $\otimes 0=1$; $\otimes 1=0$. According to these rules, a second application of the XOR operation will reproduce the original number. This is the key feature permitting conversion of M to C and back to M based upon K.

Ideally, the distribution of the random string K is uniform and independent of the distribution of M, which implies that the distribution of C is uniform and independent of the distribution of M as well. Since K is random, any attempt to decrypt C, without knowledge of K, has only a minimal chance of success.

As mentioned above, proper application of the one-time pad entails requirements which greatly limit its practicality. First, the one-time pad requires the secure distribution of as much key material as plaintext. Second, a new random string must be used for each encryption, as attacks employing multiple ciphertexts encrypted under the same key are trivial. The impracticalities associated with these two requirements are referred to as the key management problem. Effective use of the one-time pad as a foundation for a new cryptosystem requires the elimination of the key management problem. Elimination of the key management problem can be accomplished if the amount of information needed to drive the cryptosystem is significantly decreased, without diminishing the scheme's security.

Development of a secure cryptosystem further requires effective and secure random number generation. Some of the more popular random number generators in use today are based on the linear congruential method, the middle square method, multiplicative methods, and mixed methods. These are enhanced by additional techniques such as data perturbation, swapping random sample queries, cell suppression, partitioning, and complex bitwise manipulation. These methods have met with varying degrees of success in different applications, but they do not provide a definitive answer to random number generation problems.

An ideal generator would produce a truly random sequence. However, this is impossible since the generation and analysis of a truly random sequence are not feasible in finite time. An actual generator can, therefore, produce only a pseudo random sequence for which various measures of randomness can be defined. For practical use in a given application, a pseudo random number (PRN) generator should desirably possess: (i) reproducibility, (ii) computational efficiency, and (iii) adherence to standards related to that specific application.

For instance, consider the computational efficiency of a PRN generator. The generator must be both rapid in the production of a pseudo random sequence and economical in its storage. In some cases, there is a direct trade-off between the two qualities. A routine designed to generate numbers to dynamically encrypt real time transfer of data is more concerned with the speed at which it can generate a pseudo random sequence. A routine intended to generate PRNs for the encryption of electronic documents, which are then stored, must incorporate efficient storage considerations. A configuration which possesses the maximum utility for a particular application must, therefore, be determined based upon the requirements of the particular application.

When employed within cryptographic applications, the PRN generator may come under the scrutiny of a well informed enemy, equipped with modern computational resources. The enemy's goal is to reproduce a particular sequence of pseudo random values. The enemy does not possess the unique initial information (i.e. initial values, seeds, and other variable parameters) associated with the sequence he wishes to regenerate. For the generator to be useful cryptographically, any attempt by the enemy to reproduce subsequent portions of a pseudo random sequence, given a finite portion of that sequence (referred to as an attack), must have a trivial chance of success in any useful amount of time.

To insure security against cryptographical attacks, a purely statistical notion of randomness must be avoided and a more cryptographically oriented definition must be adopted. Any statistical benefits incurred from a particular PRN generator which are not directly associated with its adherence to a cryptographic definition of randomness are cosmetic, and add little to the generator's usefulness. A cryptographically strong pseudo random number generator (CSPRING) must produce sequences of values which: (i) possess minimal internal correlation, (ii) convey minimal critical information regarding their origin, and (iii) are absolutely dependent upon unique and sensitive initial conditions for proper reproduction.

Minimal internal correlation requires that a sequence of PRNs must possess an acceptably small correlation between subsequent values and close neighbors. Furthermore, long range correlations (periodicity) are equally undesirable since the existence of such correlations can offer information regarding the nature of the CSPRING used to produce the sequence.

The critical information content of the sequences generated by a CSPRING must be carefully monitored. Critical information content is the quality of a sequence that associates it with the composition of a particular PRN generator and the specific parameters it employs. Output which retains critical information may be easily attributed to a particular PRN generator. Similarly, an output which retains minimal critical information can not practically be associated with any one particular method of PRN generation. For example, any member of an unaltered sequence of iterates resulting from some recursive process retains all the critical information necessary to recreate that sequence in either direction. In this sense, the critical information content of a sequence is directly related to the degree of internal correlation between its members. One method of visualizing the critical information content of a sequence is through the use of Poincaré plots, which display a member of a sequence, $x_{n+i}$, versus another member, $x_n$. Depending upon the underlying dynamics of the PRN generator and the value of the lag i, such a plot may eventually reveal a structure which is directly dependent upon the critical information content of the sequence. Ideally, the PRN sequence used for cryptographic purposes does not reveal any such patterns.

A CSPRING must also demonstrate unique initial conditions for the generation of a pseudo random sequence, and sensitivity to any changes in those conditions. Ideally, each initial condition should eventually yield a unique pseudo random sequence, and no correlation should exist between two initial values and the similarity of the output they generate. In a realistic application, however, we do not exclude the possibility that the number of such initial conditions is relatively small.

Although many advances have been made in the science of cryptography, it is apparent that a need continues to exist for the fast and secure transmission of information. The present invention provides such a system.

SUMMARY OF THE INVENTION

It is, therefore, an object of the present invention to provide a method and system for encrypting information based upon chaotic dynamics, such that the information can be effectively and securely transmitted and deciphered.

Another object of the present invention is the provision of a method and system for the creation of pseudo-random sequences based upon chaotic dynamics.

A further object of the present invention is to provide a method and system whereby pseudo-random sequences are generated having minimal internal correlation, minimal critical information content, unique initial conditions, and sensitivity to any changes in those conditions.

It is also an object of the present invention to provide a pseudo-random number generator exhibiting reproducibility, computational efficiency, and adherence to standards related to specific applications.

These and other objects are accomplished by the present invention which comprises a method and system for the secure encryption and decryption of information. The method comprises the steps of dividing a message of length L into its character components; generating m chaotic iterates from m independent chaotic maps; producing an "initial" value based upon the m chaotic iterates; transforming the "initial" value to create a pseudo-random integer; repeating the steps of generating, producing and transforming until a pseudo-random integer sequence of length L is created; and encrypting the message as ciphertext based upon the pseudo-random integer sequence.

The sequences produced in accordance with the invention fulfill all of the requirements for generating pseudo-random integer sequences. The reproducibility of sequences generated by the chaotic maps is guaranteed by the deterministic character of the maps. The computational efficiency of the generator is a result of its recursive nature. A computer-based application performs few operations per iteration, making the generation of long strings of iterates simple and quick. The sensitivity of chaotic maps to minute changes in initial condition insures that the generator will also be sensitive to such changes. Furthermore, statistical tests show that the output of chaotic maps can be efficiently transformed so as to relate minimal critical information and possess practically no internal correlation.

Other objects, advantages and salient features of the invention will become apparent from the following detailed description, which taken in conjunction with the annexed drawings, discloses the preferred embodiment of the present invention.

DETAILED DESCRIPTION OF THE PREFERRED EMBODIMENT

Figure 1:
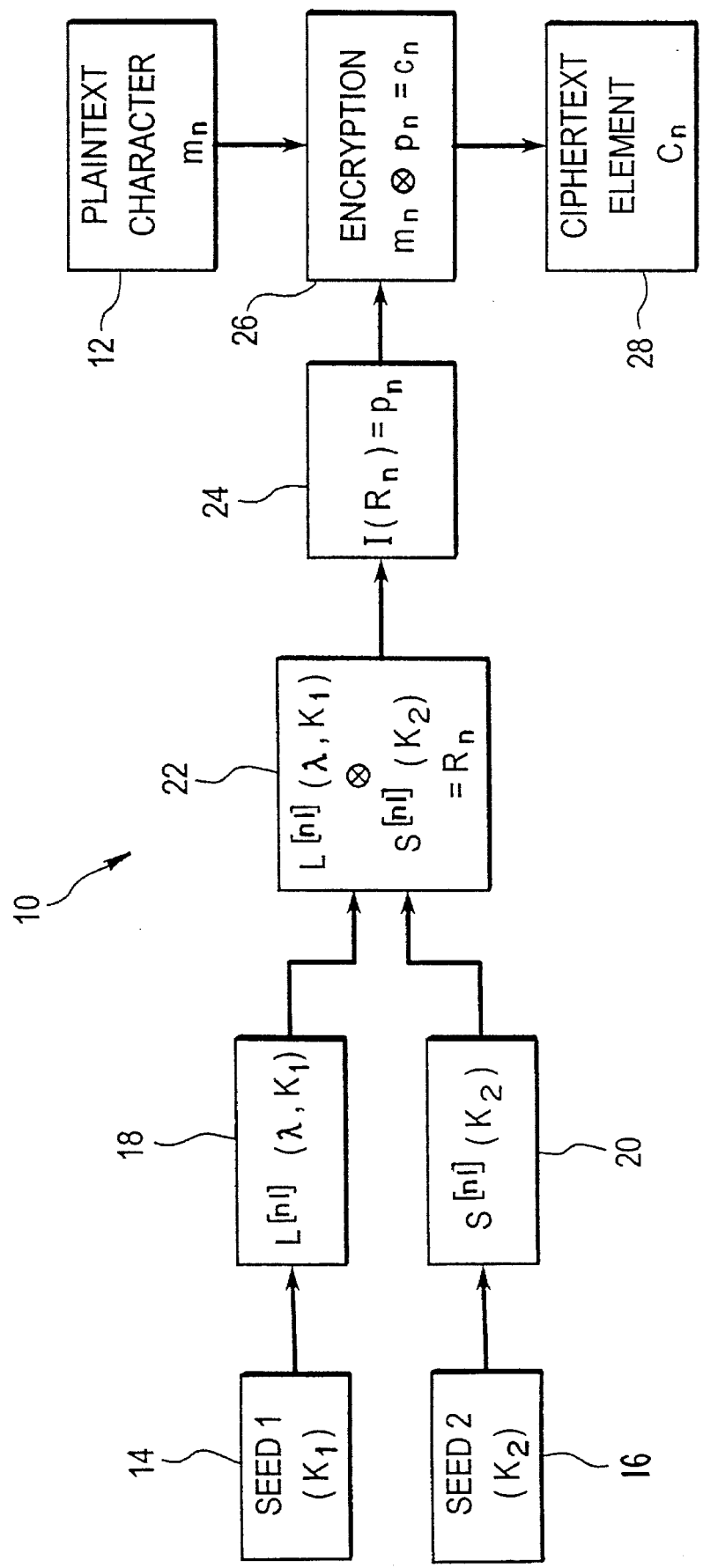
FIG. 1 is a flow chart of the encryption method and apparatus.

The present invention provides a method and system for encryption/decryption based upon the principles of chaotic dynamics. The principles of chaotic dynamics are well suited for applications in the area of cryptography, for example, the highly irregular character of chaotic dynamics successfully mimics truly stochastic behavior. Additionally, the deterministic nature of chaotic dynamics ensures simple, rapid, and accurate reproducibility.

The present invention utilizes the pseudo random behavior of chaotic dynamics to produce pseudo random sequences from a small amount of initial information. The pseudo random sequence is then combined with the plaintext message to generate the ciphertext.

The present invention 10 is outlined in FIG. 1. First, a message M of length L is separated into its component characters $m_n$ 12. These characters are represented as integer values based on their position in the alphabet $S_m$. For example, the standard ASCII character set, which represents characters as 8 bit integer values, is preferably used as $S_m$. Then the pseudo random sequence P having a length L is generated with eight bit integer components $P_n$.

The pseudo random sequence is generated in accordance with the following procedure. The procedure begins with the creation of m initial values (seeds) that are required by the m nonlinear chaotic maps, $C_1, C_2, \ldots C_m$, operating on the unit segment. Each seed is a b bit floating point value designated $K_1, K_2, \ldots K_m$.

The embodiment shown in FIG. 1 utilizes two chaotic maps (so m=2): the Bernoulli Shift ("$S(K_1)$") and the Logistic Map ("$L(\lambda, K_2)$"). The Bernoulli Shift is defined by the equation $$x_{n+1} = 2x_n \bmod 1$$

while the Logistic Map is defined by the equation $$x_{n+1} = (\lambda)x_n(1-x_n).$$

The properties of these two chaotic maps are well studied. Both possess simple recursive structures which make computer implementation quick and efficient. It should be appreciated that the present invention is not limited to applications where m=2, and the invention can be performed with one or more maps without departing from the spirit of the present invention.

Seed 1, $K_1$, 14 and seed 2, $K_2$, 16 are generated and introduced into the Logistic Map 18 and the Bernoulli Shift 20 to produce iterates in the manner discussed below.

The initial information requirements of the maps consist of one 64 bit floating point seed for each map, K, a 64 bit ($\lambda$) value for the Logistic Map (the value is a b bit floating point number that takes values in the range of (3.99, 4)), and an 8 bit integer value l (small L) describing the number of iterations between subsequent values in the pseudo random sequences, which is also referred to as the key.

Once appropriate information is provided to the chaotic maps, they iterate their respective seed 1 times to produce iterates $C_1^{(1)}(K_1)$ and $C_2^{(1)}(K_2)$. The iterates are combined via the exclusive-or operation (XOR), $\otimes$, to provide a values $R_n$ 22. The first value being $R_1$:

$$R_1 C_1^{(1)}(K_1) \otimes C_2^{(1)}(K_2)$$

Each value, $R_n$, is a 64 bit XORed product, and the binary byte consisting of bits 48 through 55 of the 64 bit XOR product is extracted and converted into an integer, $p_n$, 24. For example, the first value, $R_1$, is transformed into a pseudo random integer, $P_1 = I(R_1)$, by extracting one byte (8 bits) from a specific address in the binary representation of $R_1$ and expressing it as an integer. The value $P_1$ is the first member of the pseudo random sequence of integers $P_1, P_2, \ldots, p_n$. The additional pseudo random integers are generated by the same process using the $n^{th}$ set of chaotic iterates $C_i^{(n1)}(K_i)$, i=1, 2 as the new keys for the $(n+1)^{th}$ round. The pseudo random sequence should have a number of integers equal to the length of the message that will ultimately be encrypted in the manner discussed subsequently.

The pseudo random sequence produced in accordance with the present invention possesses all the properties outlined in the description of a CSPRNG. The sensitivity to unique initial conditions is derived from the use and combination of multiple chaotic maps. The sequences' internal correlation and critical information content are minimized by the XOR and integer generation procedures. Additionally, by selecting the byte used to generate the pseudo random integer near the end of the XOR product, minimal differences in the initial conditions precipitate quickly into significant differences in the pseudo random sequence. As a result, the procedure outlined above provides a quick and efficient CSPRNG.

Once the pseudo random sequence is generated, the ciphertext is generated by XORing the pseudo random sequence and the plaintext 26. Specifically, each plaintext character, $m_n$, is XORed with a corresponding pseudo random integer, $p_n$, to produce a ciphertext element, $c_n$, 26. The ciphertext is expressed in terms of its components $c_n$, which are defined as:

$$c_n = m_n \otimes p_n$$

Decryption follows a procedure parallel to encryption and is achieved by XORing $c_n$ and $p_n$ to generate $m_n$.

Regardless of the length of the message to be encrypted, the present invention requires a constant, relatively small amount of initial information for each message. In fact, the initial information requirements of the embodiment disclosed above consist of three 64 bit values and one 8 bit value, or 200 bits of information. This translates to the secure distribution of 25 ASCII characters per encryption, effectively eliminating the key management problem associated with the traditional one-time pad, while retaining its security.

The present cryptosystem effectively removes the key management problem of the one-time pad for a large number of practical applications, without decreasing its security. The benefits derived from employing chaotic maps in encryption are best evaluated when the present cryptosystem is subjected to various methods of attack used by an enemy. Consider, for example, two trivial methods of attack: (i) Brute Force Attacks and (ii) Key Guessing Attacks. It is not difficult to demonstrate their inefficiency as long as we observe certain rules which must be applied to our scheme.

The term Brute Force Attack describes any one of several types of attacks on a cryptosystem, most of which resort to an exhaustive search of some set of parameters intrinsic to that cryptosystem. A typical Brute Force Attack might attempt to decrypt a ciphertext by using every possible key, until the correct key is found. Such an attack is, in the case of the present invention, impractical due to the computational infeasibility of examining its large keyspace. However, while the chances are minimal, it is not inconceivable that such an attack might (very) rarely succeed. In order to maintain the security of the present invention a unique key must be used for every encryption. Doing so prevents the decryption of multiple ciphertexts in the extremely unlikely event of the enemy obtaining the key for a particular ciphertext.

A Key Guessing Attack is employed when the enemy suspects a biased distribution of initial conditions over the keyspace. Such a situation might arise when the user of the cryptosystem chooses keys which fit a discernible pattern, such as common English words or obvious combinations of the date or time. In this situation, an enemy can make use of this knowledge to reduce the size of the keyspace to a practically accessible size. In order to avoid such attacks, the key selection process must possess a uniform distribution over the keyspace. If this rule is followed a Key Guessing Attack becomes impractical.

The speed and security associated with the present cryptosystem makes it ideal for use in many situations. For example, the high throughput of our initial software implementation makes it an ideal candidate for use in the transmission of encrypted electronic mail across networks, i.e, encrypting "on the fly". A refined software application of the present invention, or a dedicated hardware implementation, would operate at speeds sufficient for the dynamic encryption of high speed data transfer, making the real time encryption of digital communications practical. The present inventions strength makes it equally useful for the encryption of high security documents and information. Such demands might arise due to the results of industrial espionage, electronic theft and laundering, or violations of network security. While the present invention is sufficient for applications requiring speed or security, its powerful combination of the two qualities makes it suitable for applications which demand both, offering a versatile alternative to iterated cryptosystems.

Other applications include: telemedicine, record keeping, financial transactions, or exchange of technical information. The simplicity and efficiency of the concept, its straightforward implementation on high performance chips, and the practically infinite size of the key-space make this invention suitable for "CUSTOMIZED ENCRYPTION" and CUSTOMIZED SECURITY.

To demonstrate the utility of the present invention, a computer application was developed. The computer hardware used in the development of the DOS version of this program consists of a Northgate Computer Systems, Inc. 386 personal computer running Microsoft's MS-DOS 5.0. This machine makes use of the Intel 80386 - 25 MHz 32 bit processor and the Intel 80387 numeric coprocessor. The 80387 numeric coprocessor provides for the quick manipulation of floating point operations, and is capable of supporting an 80 bit extended precision floating point mode. Standard IEEE rounding modes are also supported, the default state of round to nearest was used in all floating point calculations. The source code was developed using Borland Turbo C++ version 3.0.

Additional routines were added to handle user input and file I/O. The program is a command line encryptor; when invoking it a source file is specified on the command line. This file serves as the input for encryption, the plaintext, and is overwritten by encrypted output, the ciphertext. As described before, a pseudo random 8 bit value (one byte) is extracted from the XOR product of two chaotic iterates, and is XORed with a plaintext byte. The XOR value of the pseudo random and plaintext bytes is output as the ciphertext byte. Due to the properties of the XOR operation, encryption and decryption are identical functions. To decrypt a file, the present invention is invoked with the encrypted file specified as the source file. By supplying the proper initial conditions, the correct pseudo random sequence is generated and XORed with the ciphertext, reproducing the original plaintext.

The DOS version of this program has been extensively tested with various types of files, functioning equally well on both text and binary data. Even on a low end platform like the 80386 computer used here it functioned with throughput on the order of 16k/sec (average). Note that this rate includes the delay caused by disk I/O, which was optimized through the use of multiple buffers but still requires a significant amount of time for large files.

A UNIX version of this program was also developed, using vendor supplied compilers to compile the code on different workstations. An HP 9000/730 workstation was used as the primary development platform, with versions ported to IBM RISC/6000 580 and SGI Indigo (R3000) workstations. Ciphertexts were interchangeable between these three machines. A message encrypted on one machine was correctly decrypted on another. As such, differences in architecture and consequently different methods of addressing floating point numbers on different workstations do not prevent encryption and decryption across platforms. The high throughputs for these workstations, displayed in the table below, makes this cryptosystem ideal for applications involving high speed transfer of data over networks and phone lines.

| Platform/ Processor | File Size (bytes) | PRESENT INVENTION Encryption Time (seconds) |
| --- | --- | --- |
| 386-25 MHz | 519750 | 32.8 |
| 486-33 MHz | 519750 | 7.96 |
| IBM RISC/6000 580 | 519750 | 1.1 |
| HP 9000/730 | 519750 | 1.9 |
| SGI Indigo (R3000) | 519750 | 6.7 |

While the preferred embodiment of the present invention has been shown and described, it will be understood that it is not intended to limit the disclosure, but rather it is intended to cover all modifications and alternate methods falling within the spirit and scope of the invention as defined in the appended claims or their equivalents.

What is claimed is:

1. An encryption method, comprising the steps of:
    dividing a message of length L into its character components;
    generating m chaotic iterates from m independent chaotic maps;
    producing a pseudo random integer based upon the m chaotic iterates;
    repeating the steps of generating and producing until a pseudo random integer sequence of length L is created; and
    encrypting the message as ciphertext based upon the pseudo random integer sequence.

2. The method according to claim 1, wherein, for m=2, the first chaotic map is defined by the equation $x_{n+1}=2x_n \mod 1.$ 3. The method according to claim 2, wherein, for m=2, the second chaotic map is defined by the equation $x_{n+1}=(\lambda)x_n(1-x_n).$ 4. The method according to claim 1, wherein, for m=2, the second chaotic map is defined by the equation $x_{n+1}=(\lambda)x_n(1-x_n).$ 5. The method according to claim 1, wherein the step of encrypting the message comprises combining the message and the pseudo random integer sequence by a bitwise mechanism.

6. The method according to claim 5, wherein the bitwise mechanism is an exclusive-or operation.

7. The method according to claim 1, wherein, for m=2, the step of producing includes combining the m chaotic iterates by a bitwise mechanism.

8. The method according to claim 7, wherein the bitwise mechanism is an exclusive-or operation.

9. The method according to claim 1, further comprising the step of decrypting the ciphertext to the message based upon the pseudo random integer sequence.

10. The method according to claim 9, wherein the step of decrypting the ciphertext comprises combining the ciphertext and the pseudo random integer sequence by a bitwise mechanism.

11. The method according to claim 10, wherein the bitwise mechanism is an exclusive-or operation.

12. An encryption system comprising:
   means for dividing a message of length L into its character components;
   means for generating m chaotic iterates from m independent chaotic maps;
   means for producing a pseudo random integer based upon the m chaotic iterates;
   means for repeating the steps of generating and producing until a pseudo random integer sequence of length L is created; and
   means for encrypting the message as ciphertext based upon the pseudo random integer sequence.

13. The system according to claim 12, wherein, for m=2, the first chaotic map is defined by the equation $x_{n+1}=2x_n \mod 1.$ 14. The system according to claim 13, wherein the second chaotic map is defined by the equation $x_{n+1}=(\lambda)x_n(1-x_n).$ 15. The system according to claim 12, wherein, for m=2, the second chaotic map is defined by the equation $x_{n+1}=(\lambda)x_n(1-x_n).$ 16. The system according to claim 12, wherein the means for encrypting the message comprises a bitwise mechanism for combining the message and the pseudo random integer sequence.

17. The system according to claim 16, wherein the bitwise mechanism is an exclusive-or operation.

18. The system according to claim 12, wherein, for m=2, the means for producing includes means for combining the m chaotic iterates by a bitwise mechanism.

19. The system according to claim 18, wherein the bitwise mechanism is an exclusive-or operation.

20. The method according to claim 12, further comprising means for decrypting the ciphertext to the message based upon the pseudo random integer sequence.

21. The system according to claim 20, wherein the means for decrypting the ciphertext comprises a bitwise mechanism for combining the ciphertext and the pseudo random integer sequence.

22. The system according to claim 21, wherein the bitwise mechanism is an exclusive-or operation.

* * * * *